(12) United States Patent
Meier et al.

(10) Patent No.: US 7,890,315 B2
(45) Date of Patent: Feb. 15, 2011

(54) PERFORMANCE ENGINEERING AND THE APPLICATION LIFE CYCLE

(75) Inventors: John D. Meier, Bellevue, WA (US); Srinath Vasireddy, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 73 days.

(21) Appl. No.: 11/382,861

(22) Filed: May 11, 2006

(65) Prior Publication Data
US 2007/0156375 A1 Jul. 5, 2007

Related U.S. Application Data

(63) Continuation-in-part of application No. 11/321,818, filed on Dec. 29, 2005, now abandoned.

(51) Int. Cl.
*G06F 9/45* (2006.01)

(52) U.S. Cl. .................... 703/22; 703/1; 703/6

(58) Field of Classification Search ............ 703/6, 703/1, 22
See application file for complete search history.

(56) References Cited

U.S. PATENT DOCUMENTS

| | | |
|---|---|---|
| 5,107,499 A | 4/1992 | Lirov |
| 5,446,680 A | 8/1995 | Sekiya et al. |
| 5,751,949 A | 5/1998 | Thomson et al. |
| 5,812,780 A | 9/1998 | Chen et al. |
| 6,067,412 A | 5/2000 | Blake et al. |
| 6,167,521 A | 12/2000 | Smith et al. |
| 6,209,101 B1 | 3/2001 | Mitchem et al. |
| 6,256,773 B1 | 7/2001 | Bowman-Amuah |
| 6,377,994 B1 | 4/2002 | Ault |
| 6,408,391 B1 | 6/2002 | Huff et al. |
| 6,457,040 B1 | 9/2002 | Mizuhara et al. |
| 6,584,569 B2 | 6/2003 | Reshef et al. |
| 6,609,100 B2 | 8/2003 | Smith |
| 6,631,473 B2 | 10/2003 | Townsend |
| 6,643,775 B1 | 11/2003 | Granger |
| 6,668,325 B1 | 12/2003 | Collberg |

(Continued)

FOREIGN PATENT DOCUMENTS

WO    9853399    11/1998

(Continued)

OTHER PUBLICATIONS

Papaefstathiou, "Design of a Performance Technology Infrastructure to Support the Construction of Responsive Software" Microsoft Sep. 26, 2000.*

(Continued)

*Primary Examiner*—Kamini S Shah
*Assistant Examiner*—Saif A Alhija
(74) *Attorney, Agent, or Firm*—Workman Nydegger

(57) ABSTRACT

A novel approach to performance engineering that leverages expertise to enable a user to design, build and deploy reliable and efficient applications is disclosed. In doing so, the innovation discloses novel techniques and mechanisms that integrate performance into the application development lifecycle and to adapt current software engineering practices and methodologies to include specific performance related activities. These activities include identifying performance objectives, creating performance models, applying performance-related design guidelines, conducting performance-related design inspections, performing regular code inspections, testing for performance, and conducting performance-related deployment inspections.

19 Claims, 14 Drawing Sheets

U.S. PATENT DOCUMENTS

| | | |
|---|---|---|
| 6,742,143 B2 | 5/2004 | Kaler et al. |
| 6,782,425 B1 | 8/2004 | Germscheid et al. |
| 6,816,886 B2 | 11/2004 | Elvanoglu et al. |
| 6,836,845 B1 | 12/2004 | Lennie et al. |
| 6,850,985 B1 | 2/2005 | Giloi et al. |
| 6,912,502 B1 | 6/2005 | Buddle |
| 6,915,454 B1 | 7/2005 | Moore et al. |
| 6,959,393 B2 | 10/2005 | Hollis et al. |
| 6,971,026 B1 | 11/2005 | Fujiyama |
| 6,980,927 B2 | 12/2005 | Tracy et al. |
| 6,981,281 B1 | 12/2005 | LaMacchia et al. |
| 6,985,946 B1 | 1/2006 | Vasandani |
| 6,993,448 B2 | 1/2006 | Tracy et al. |
| 6,996,845 B1 | 2/2006 | Hurst et al. |
| 7,000,219 B2 | 2/2006 | Barrett |
| 7,013,395 B1 | 3/2006 | Swiler et al. |
| 7,032,114 B1 | 4/2006 | Moran |
| 7,096,502 B1 | 8/2006 | Fox |
| 7,219,304 B1 | 5/2007 | Kraenzel |
| 7,231,661 B1 | 6/2007 | Villavicencio |
| 7,249,174 B2 | 7/2007 | Srinivasa |
| 7,370,359 B2 | 5/2008 | Hrabik |
| 2002/0007229 A1 | 1/2002 | Hudson |
| 2002/0078380 A1 | 6/2002 | Lin |
| 2002/0144128 A1 | 10/2002 | Rahman et al. |
| 2002/0161903 A1 | 10/2002 | Beasaw |
| 2003/0005326 A1 | 1/2003 | Flemming |
| 2003/0014644 A1 | 1/2003 | Burns et al. |
| 2003/0033516 A1 | 2/2003 | Howard et al. |
| 2003/0120938 A1 | 6/2003 | Mullor |
| 2003/0172292 A1 | 9/2003 | Judge |
| 2003/0217277 A1 | 11/2003 | Narayanan |
| 2003/0233431 A1 | 12/2003 | Reddy |
| 2003/0233571 A1 | 12/2003 | Kraus |
| 2004/0003286 A1 | 1/2004 | Kaler et al. |
| 2004/0103200 A1 | 5/2004 | Ross et al. |
| 2004/0139353 A1 | 7/2004 | Forcade |
| 2004/0205711 A1 | 10/2004 | Ishimitsu |
| 2004/0221163 A1 | 11/2004 | Jorgensen et al. |
| 2004/0230831 A1 | 11/2004 | Spelman et al. |
| 2004/0260754 A1 | 12/2004 | Olson et al. |
| 2005/0004863 A1 | 1/2005 | Havrilak |
| 2005/0015591 A1 | 1/2005 | Thrash et al. |
| 2005/0015752 A1 | 1/2005 | Alpern et al. |
| 2005/0022003 A1 | 1/2005 | Oliphant |
| 2005/0022021 A1 | 1/2005 | Bardsley et al. |
| 2005/0022172 A1 | 1/2005 | Howard |
| 2005/0039046 A1 | 2/2005 | Bradlsey et al. |
| 2005/0044405 A1 | 2/2005 | Spraggs |
| 2005/0044418 A1 | 2/2005 | Miliefsky et al. |
| 2005/0055565 A1 | 3/2005 | Fournet |
| 2005/0091227 A1 | 4/2005 | McCollum et al. |
| 2005/0102536 A1 | 5/2005 | Patrick |
| 2005/0120231 A1 | 6/2005 | Harada et al. |
| 2005/0125272 A1 | 6/2005 | Hostetler |
| 2005/0131978 A1 | 6/2005 | Meredith et al. |
| 2005/0138426 A1 | 6/2005 | Styslinger |
| 2005/0144471 A1 | 6/2005 | Shupak et al. |
| 2005/0182941 A1 | 8/2005 | Della-Libera et al. |
| 2005/0182969 A1 | 8/2005 | Ginter et al. |
| 2005/0188221 A1 | 8/2005 | Motsinger et al. |
| 2005/0190769 A1 | 9/2005 | Smith |
| 2005/0198332 A1 | 9/2005 | Laertz et al. |
| 2005/0198520 A1 | 9/2005 | Bardsley et al. |
| 2005/0234926 A1 | 10/2005 | Warner |
| 2005/0246716 A1 | 11/2005 | Smith et al. |
| 2005/0246776 A1 | 11/2005 | Chawro et al. |
| 2005/0273860 A1 | 12/2005 | Chess |
| 2005/0283622 A1 | 12/2005 | Hall |
| 2005/0283831 A1 | 12/2005 | Ryu et al. |
| 2006/0230430 A1 | 10/2006 | Hondo |
| 2006/0236394 A1 | 10/2006 | Morrow |
| 2006/0265740 A1 | 11/2006 | Clark |
| 2006/0277606 A1 | 12/2006 | Yunus |
| 2006/0282891 A1 | 12/2006 | Pasko |
| 2007/0016955 A1 | 1/2007 | Goldberg |
| 2007/0156420 A1 | 7/2007 | Meier |
| 2007/0157156 A1 | 7/2007 | Meier |
| 2007/0157311 A1 | 7/2007 | Meier |
| 2007/0162890 A1 | 7/2007 | Meier |
| 2007/0192344 A1 | 8/2007 | Meier |
| 2007/0199050 A1 | 8/2007 | Meier |
| 2007/0204346 A1 | 8/2007 | Meier |
| 2007/0289009 A1 | 12/2007 | Phan-Anh |
| 2008/0098479 A1 | 4/2008 | O'Rourke |

FOREIGN PATENT DOCUMENTS

| | | |
|---|---|---|
| WO | WO 0056027 A1 | 9/2000 |
| WO | WO 03/101069 A1 | 12/2003 |

OTHER PUBLICATIONS

Devanbu et al. "Software Engineering for Security: a Roadmap" ACM 2000.*

Papaefstathiou, "Design of a Performance Technology Infrastructure to Support the Construction of Responsive Software".*

Verkamo et al. "Measuring Design Diagrams for Product Quality Evaluation".*

Fox "Performance Engineering as a Part of the Development Life Cycle for Large-Scale Software Systems".*

MSDN. "Chapter 1—Fundementals of Engineering for Performance" http://msdn.microsoft.com/library/en-us/dnpag/html/scalenetchapt01.asp?frame=true last viewed Dec. 1, 2006, 9 pages.

Connie U. Smith et al., Performance Engineering Evaluation of Object-Oriented Systems with SPE•ED™, Computer Performance Evaluation: Modelling Techniques and Tools, No. 1245, Springer-Verlag, Berlin, 1997, 21 pages.

Connie U. Smith et al., Software Performance Engineering: A Case Study Including Performance Comparison with Design Alternatives, IEEE Transactions on Software Engineering, Jul. 1993, pp. 720-741, vol. 19, No. 7.

Simonetta Balsamo et al., Deriving Performance Models from Software Architecture Specifications, viewed at http://www.dsi.unive.it/~balsamo/saladin/bal-sim.2.01.pdf, 6 pages.

Stephen S. Yau, An Integrated Life-Cycle Model for Software Maintenance, IEEE Transactions on Software Engineering, Aug. 1988, pp. 1128-114, vol. 14, No. 8.

Notice of Allowance dated Jan. 29, 2010 cited in U.S. Appl. No. 11/363,142.

Office Action dated Mar. 2, 2010 cited in U.S. Appl. No. 11/321,425.

Office Action dated Apr. 28, 2010 cited in U.S. Appl. No. 11/382,858.

Office Action dated Apr. 28, 2010 cited in U.S. Appl. No. 11/321,153.

U.S. Appl. No. 11/353,821, filed Jul. 30, 2010, Notice of Allowance.

U.S. Appl. No. 11/382,858, filed Sep. 2, 2010, Office Action.

U.S. Appl. No. 11/321,425, filed Jul. 21, 2010, Office Action.

Smith, Designing High-Performance Distributed Applications Using Software Performance Engineering: A Tutorial. Performance Engineering Services 1996.

Wiederhold, The Roles of Artificial Intelligence in Information Systems. Journal of Intelligent Information Systems. 1992.

Adding Application Security. Http://www.technicalinfo.net/opinions/opinion024.html, last accessed on Nov. 15, 2005, 2 pages.

Brose, Securing Web Services with SOAP Security Proxies, 4 pages, 2003.

Chadwick, D., Threat Modelling for Active Directory, 10 pages, 2005.

D Snow and W. Chang, Network security, 1992. http://ieeexplore.ieee.org/search/srchabstract.jsp?Amumber=267863&isnumber=6694&punumber=630&k2dockey=267863@ieeecnfs&query=%28network+security%29%3Cin%3Emetadata&pos=8, 1988.

Desmet, L., et al, Threat Modelling for Web Services Based Web Applications, 14 pages, 2005.

Dunn, M., Cyber-Threats and Countermeasures Towards an Analytical Framework for Explaining Threat Politics in the Information Age, Aug. 2004, 35 pages.

FortiGateTM Series of ASIC-accelerated multi-threat security systems. Http://www.fortinet.com/products/, 2006.

Gerald A. Marin, Network security basics, Basic Training, IEEE Security & Privacy, Published by the IEEE Computer Society, Nov./Dec. 2005. http://ieeexplore.ieee.org/search/srchabstract.jsp?Amumber=1556540&isnumber=33104&punumber=8013&k2dockey=1556540@ieeejms&query=%28network+security%29%3Cin%3Emetadata&pos=6.

Hondo, et al., Securing Web Services: 2002, 12 pages.

J.D Meier, et al., Threat Modelling Web Applications, May 2005. http://msdn.microsoft.com/library/default.asp?url=/library/en-us/dnpag2/html/tmwa.asp, last accessed on Nov. 15, 2005, 6 pages.

Jian Tao, et al., The research on dynamic self-adaptive network security model based on mobile agent, National Engineering Research Center for Computer Software, 308 Mailbox of Northeastern University, Shen yang, 110006, China. Http://ieeexplore.ieee.org/search/srchabstract.jsp?amumber=885909&isnumber=19142&punumber-7108&k2dockey=885908@ieeecnfs@query=%28network+security, 2000.

Jon Oltsik, Information Security Brief, Apr. 2005, accessible at http://www.appsecinc.com/news/APPSECINC_April. Pdf, 3 pages.

Joshi, et al., Security models for Web-based applications; 2001, 7 pages.

Security in a Web Services World: a Proposed Architecture and Roadmap, Apr. 7, 2002. http://msdn.microsoft.com/library/default.asp?url=/library/en-us/dnwssecur/html/securitywhitepaper.asp, last accessed on Nov. 15, 2005, 20 pages.

Tadashi Ohta and Tetsuya Chikaraishi, Network security model, ATR Communication Systems Research Laboratories, 2-2, Hikaridai, Seika-cho, Soraku-gun, Kyoto 619-02, Japan. Http://ieeexplore.ieee.org/search/srchabstract.jsp?Amumber=515640&isnumber=11283&punumber=3866&k2dockey=515640@ieeecnfs&query=%28network+security%, 2002.

OA dated Dec. 5, 2008 for U.S. Appl. No. 11/321,818 18 pages.

Patterns and Practices Security Engineering Explained; 2 pages; http://msdn.microsoft.com/library/default.asp?url=/library/en-us/dnpag2/html/scccngexplained.asp; last viewed Mar. 29, 2005.

Meier,J.D., et al; Patterns and Practices Security Index; Aug. 2005; 5 pages; http://msdn.microsoftcom/library/default.asp?url=/library/en-us/dnpag2/html/securityengindex.asp.

Meier,J.D., et al; Patterns and Practices Web Application Security Engineering Index; Aug. 2005; 4 pages; http://msdn.microsoft.com/library/default.asp?url=/library/en-us/dnpag2/html/WebAppSecurityEngIndex.asp last viewed Mar. 29, 2005.

Meier,J.D., et al; Patterns and Practices Security Deployment ReviewIndex; Aug. 2005; 2 pages; http://msdn.microsoft.com/library/en-us/dnpag2/html/SecurityDeploymentReviewIndex.asp. Last viewed Mar. 29, 2005.

Meier,J.D., et al; Security Engineering Explained; 2205; 51 pages.

".NET Framework Security", by Meier et al., MIcrosoft Corporation, Jun. 2003.

Kudo, et al., XML Document Security Based on Provisional Authorization; 2000; 10 Pages.

Meier, J. et al., Chapter 2—Threats and Countermeasures: Improving Web Application Security; Jun. 2003, 22 Pages; http://msdn.microsoft.com/library/default.asp?url=/library/en-us/dnnetsec/html/THCMCh02.asp; last viewed May 1, 2006.

L. Liu et al., Security and Privacy Requirements Analysis within a Social Setting, Proceedings of the 11th IEEE Joint International Congerence on Requirements Engineering (RE), Sep. 8-12, 2003, pp. 151-161.

R. Crook et al., Security Requirements Engineering: When Anti-Requirements Hit the Fan, Proceedings of the IEEE Joint International Conference on Requirements Engineering(RE'02), IEEE Computer Society, 2002, 3 Pages.

Office Action dated Feb. 11, 2008 cited in U.S. Appl. No. 11/321,153.
Office Action dated Mar. 6, 2009 cited in U.S. Appl. No. 11/321,153.
Office Action dated Mar. 19, 2008 cited in U.S. Appl. No. 11/382,857.
Office Action dated Oct. 17, 2008 cited in U.S. Appl. No. 11/382,857.
Office Action dated Mar. 6, 2009 cited in U.S. Appl. No. 11/382,857.
Office Action dated Jun. 23, 2008 cited in U.S. Appl. No. 11/321,818.
Office Action dated Mar. 24, 2009 cited in U.S. Appl. No. 11/321,818.
Office Action dated May 15, 2009 cited in U.S. Appl. No. 11/321,425.
Office Action dated Aug. 4, 2009 cited in U.S. Appl. No. 11/382,858.
Office Action dated Apr. 2, 2009 cited in U.S. Appl. No. 11/363,142.
Office Action dated Jun. 22, 2009 cited in U.S. Appl. No. 11/353,821.
Office Action dated Sep. 10, 2009 cited in U.S. Appl. No. 11/363,142.

Meier,J.D., et al.; Cheat Sheet: Web Application Security Frame; May 2005; 6 pages; http://msdn.microso ft.com/1ibrary/default.asp?url=/library/en-us/dnpag2/htmlTMWAcheatsheet.asp.

Meier,J.D., et al.; Improving Web Application Security: Threats and Countermeasures; Jun. 2003; 6 pages; http://msdn.microsoft.com/library/default.asp?url=/library/en-us/dnnetsec/html/ThreatCounter.asp last viewed Mar. 29, 2005.

"Performance and Scalability of Distributed Software Architectures: An SPE Approach", Smith et al., CiteSeer 2002.

Microsoft Corporation; Patterns and Practices Security Engineering Explained; Oct. 2005; 4 pages; http://msdn.microsoft.com/library/default.asp?url=/library/en-us/dnpag2/html/scccngexplained.asp.

Office Action dated Sep. 14, 2009 cited in U.S. Appl. No. 11/321,153.

Wiederhold "The Roles of Artificial Intellignece in Information Systems", Hounal of Intelligent Information Systems. 1992.

Office Action dated Nov. 10, 2009 cited in U.S. Appl. No. 11/353,821.
Office Action dated Nov. 25, 2009 cited in U.S. Appl. No. 11/321,425.
Office Action dated Dec. 9, 2009 cited in U.S. Appl. No. 11/321,818.
Office Action dated Jan. 7, 2010 cited in U.S. Appl. No. 11/382,857.
Office Action dated Jan. 11, 2010 cited in U.S. Appl. No. 11/382,858.

* cited by examiner

PERFORMANCE AND SCALABILITY FRAME — 602

- COUPLING AND COHESION
- COMMUNICATION
- CONCURRENCY
- RESOURCE MANAGEMENT
- CACHING, STATE MANAGEMENT
- DATA STRUCTURES/ALGORITHMS

FIG. 7

PERFORMANCE ENGINEERING AND THE APPLICATION LIFE CYCLE

CROSS-REFERENCE TO RELATED APPLICATIONS

This application is a Continuation-in-Part of pending U.S. patent application Ser. No. 11/321,818 entitled "PERFORMANCE MODELING AND THE APPLICATION LIFE CYCLE" and filed Dec. 29, 2005. The entirety of the above-noted application is incorporated by reference herein.

BACKGROUND

Analysis of software systems has proven to be extremely useful to development requirements and to the design of systems. As such, it can be particularly advantageous to incorporate performance analysis into the software development life cycle from the beginning stage of design. Recently, there has been a growing trend to incorporate performance analysis into the software specification. However, these conventional systems lack accuracy and ease of implementation.

Today, when developing an application, it is oftentimes difficult to predict how the application will react under real-world conditions. In other words, it is difficult to predict the performance of an application prior to and during development and/or before completion. Frequently, upon completion, a developer will have to modify the application in order to adhere to real-world conditions. This modification can consume many hours of programming time and delay application deployment—each of which is very expensive.

By way of example, it is often difficult for a programmer to predict operational performance of an application without knowing specific operating environment criterion. In one example, applications often react differently if utilized by a single user as when utilized by a multitude of users. More particularly, the response time of an application is most often decreased upon a multi-user load as opposed to a single user load. Similarly, processor performance reacts differently upon different operating conditions. These and other criteria greatly affect the performance of an application.

While many of these criterions can be estimated with some crude level of certainty, others cannot. For those criterions that can be estimated prior to development, this estimate most often requires a great amount of research and guesswork in order to most accurately determine the criterion. The conventional guesswork approach of performance prediction is not based upon any founded benchmark. As well, these conventional approaches are not systematic in any way. In other words, conventional systems do not enable repetitive testing and/or validation when accessing performance within the application life cycle.

In accordance with traditional application life cycle development, it is currently not possible to proactively (and accurately) address performance issues from the beginning to the end of the life cycle. To the contrary, developers often find themselves addressing performance issues after the fact—after development is complete. This retroactive performance modeling approach is extremely costly and time consuming to the application life cycle.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a novel approach to performance engineering that leverages expertise to enable a user to design, build and deploy applications that adhere to performance objectives. In doing so, the innovation discloses novel techniques and mechanisms to integrate performance into the application development lifecycle and to adapt current software engineering practices and methodologies to include specific performance related activities. In one aspect, these activities include identifying performance objectives, creating performance models, applying performance design guidelines, patterns and principles, conducting performance design inspections, performing regular performance code inspections, testing for performance, and conducting performance deployment inspections to ensure adherence to performance goals.

The innovation enables performance to be baked into the application lifecycle. In order to be effective, upfront performance design evaluated against a defined set of performance objectives is often required. The subject innovation discloses novel features, techniques, mechanisms and activities for upfront performance design.

In accordance with the innovation, the performance related activities start early and can continue throughout the lifecycle, many in parallel with one another. The performance objectives can be considered alongside other critical business objectives. Application specific performance objectives can be identified and documented early during requirements and analysis and can be balanced along side other quality of service requirements such as security, availability and reliability.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 7 illustrates an exemplary performance and scalability frame in accordance with an aspect of the innovation.

DETAILED DESCRIPTION

Figure 1:
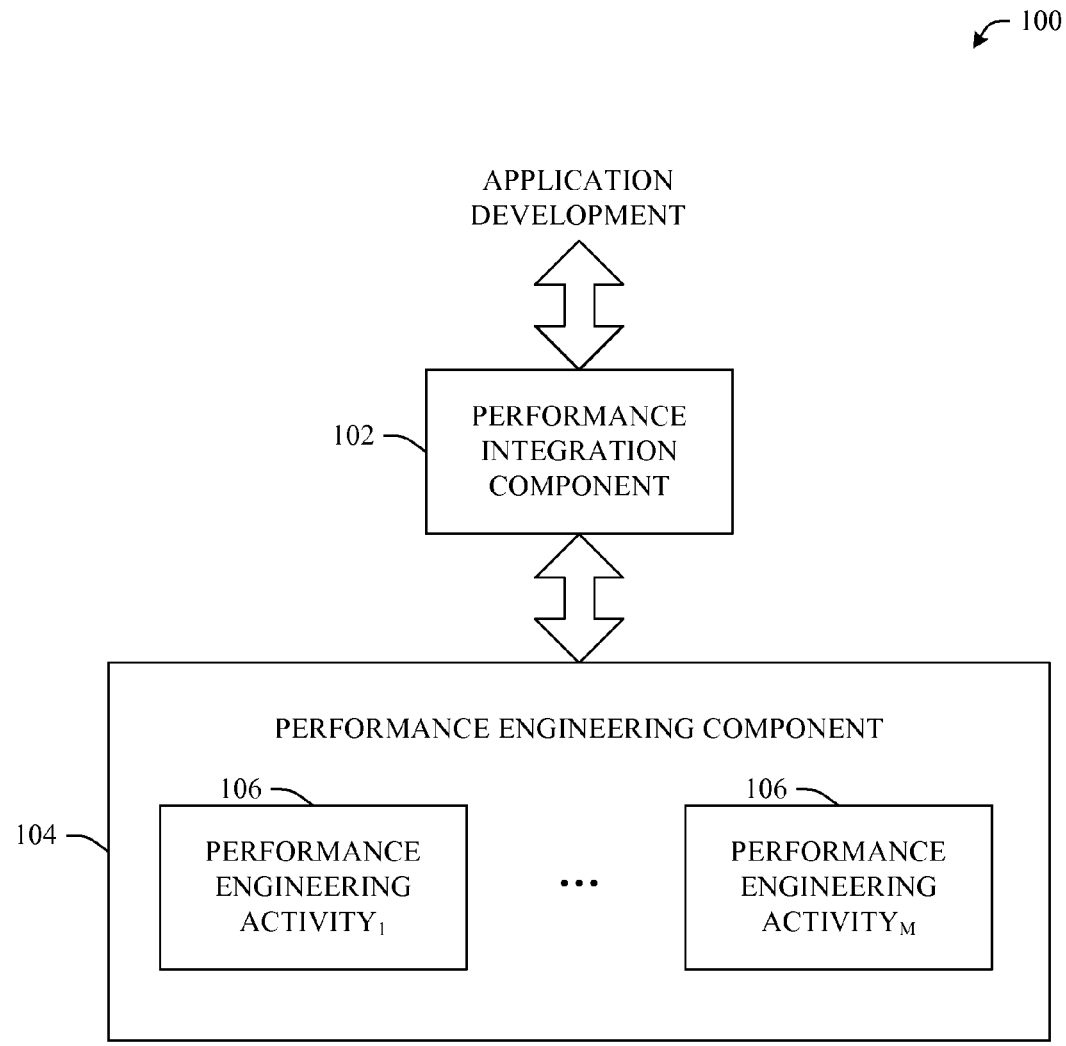
FIG. 1 illustrates a system that integrates performance engineering into the application development life cycle in accordance with an aspect of the innovation.

The following terms are used throughout the description, the definitions of which are provided herein to assist in understanding various aspects of the subject innovation.

A "Threat" is an undesired event. A potential occurrence, often best described as an effect that might damage or compromise an asset or objective. It may or may not be malicious in nature.

A "Vulnerability" is a weakness in some aspect or feature of a system that makes an exploit possible. Vulnerabilities can exist at the network, host, or application levels and include operational practices.

An "Attack" is an action taken that uses one or more vulnerabilities to realize a threat This could be someone following through on a threat or exploiting a vulnerability.

A "Countermeasure" addresses vulnerabilities to reduce the probability of attacks or the impacts of threats. Countermeasures do not directly address threats; instead, they address the factors that define the threats. Countermeasures range from improving application design, or improving code, to improving an operational practice.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates predictably and systematically meeting performance objectives thereby enhancing effective operation in accordance with an aspect of the innovation. Generally, the system 100 can include a performance integration component 102 and a performance engineering component 104 having 1 to M performance engineering activities therein. The 1 to M performance engineering activities can be referred to individually or collectively as performance engineering activities 106.

In one particular aspect, the performance engineering component 104 can include specific performance related activities 106. By way of example, the activities 106 can include identifying performance objectives, establishing design guidelines, performance modeling, performance design inspection, performance code inspection, performance testing, performance deployment inspection and capacity planning. Each of these performance engineering activities will be described in greater detail with reference to the figures that follow.

In general, the innovation discloses a novel patterns & practices approach to performance engineering. To design, build, and deploy optimized applications, a developer can employ the performance integration component 102 to proactively incorporate performance into the application development life cycle by including specific performance-related activities (e.g., 106) in the current software engineering processes. As stated above, the performance-related activities 106 can include identifying performance objectives, establishing design guidelines, performance modeling, performance design inspection, performance code inspection, performance testing, performance deployment inspection and capacity planning. The developer or user can adopt these activities 106 incrementally as desired. The combination of these activities 106 can provide tools, guidance, and workflow to help make performance awareness an integral part of the development experience.

In accordance with aspects of the innovation, performance objectives can be defined early in the development process. Performance objectives can be goals related to a variety of categories including, but not limited to, response time, throughput, resource utilization, workload, etc. Performance modeling facilitates understanding and prioritization of the performance issues relevant to a specific application scenario. The innovation discloses proven practices, patterns and principles that can assist in avoiding many performance issues introduced by poor design choices. By organizing these design patterns and practices into novel categories, the user can focus on those key areas where performance issues are often overlooked or mistakes are made.

In another aspect, the innovation discloses an architecture and design inspection process that analyzes the application architecture and design from a performance perspective. By way of example, the innovation considers a number of aspects including layers and tiers inspection, logical partitioning and boundaries related to a target deployment environment and the application life cycle.

All code should be subject to code inspections where the emphasis is on performance. This should be a continual activity during the development phase of the lifecycle. With respect to performance testing, in one aspect, load testing, stress testing and capacity testing can be employed. By using these specific activities for performance engineering, the user can leverage performance related expertise into the application life cycle by knowing where to start, how to proceed, and when the process is complete.

As illustrated in FIG. 1, and the figures that follow, in summary, this innovation describes an approach for proactively integrating performance into the software development life cycle. It describes the set of performance activities 106 that could be employed to refine and extend existing life cycle activities. In all, the innovation presents an overview of the approach and explains some of the main performance engineering activities as well as how to adopt them.

The system 100 can provide at least the following novel features. The system 100 can provide end-to-end guidance on building software applications that meet specified and/or defined performance objectives throughout the application life cycle. As will be described in further detail infra, the guidance can use a novel performance frame which is a pattern-based information model that defines a set of performance-related categories specifically for the application type being designed. These categories can represent areas such as, coupling and cohesion, resource management, communication, caching, state management, concurrency, data structures/algorithms, etc., The novel principles & practices mechanisms of the subject innovation serve as a foundation for performance guidance and provide a stable basis for performance-related recommendations. With respect to processes and activities, the guidance provides steps for key activities including performance modeling, performance architecture and design inspections, performance code inspections and performance deployment inspections. Although specific performance-related activities are described herein, it is to be understood that each module or activity within the guidance is designed to be read independently.

In summary, the patterns & practices approach to performance engineering focuses on integrating performance into the life cycle through the adoption of a set of key performance activities 106. As will be described below, the specific activities 106 that make up the performance engineering discipline can include defining performance objectives, applying design guidelines for performance, creating performance models, conducting architecture and design inspections for performance, completing code inspections for performance, and performing deployment inspections for performance. While these specific performance activities 106 are described herein, it is to be understood that additional and/or disparate activities can be incorporated without departing from the spirit and scope of the innovation. As such, these additional performance-related activities are to be included within the scope of this disclosure and claims appended hereto. A user can adopt these activities incrementally as desired.

Figure 2:
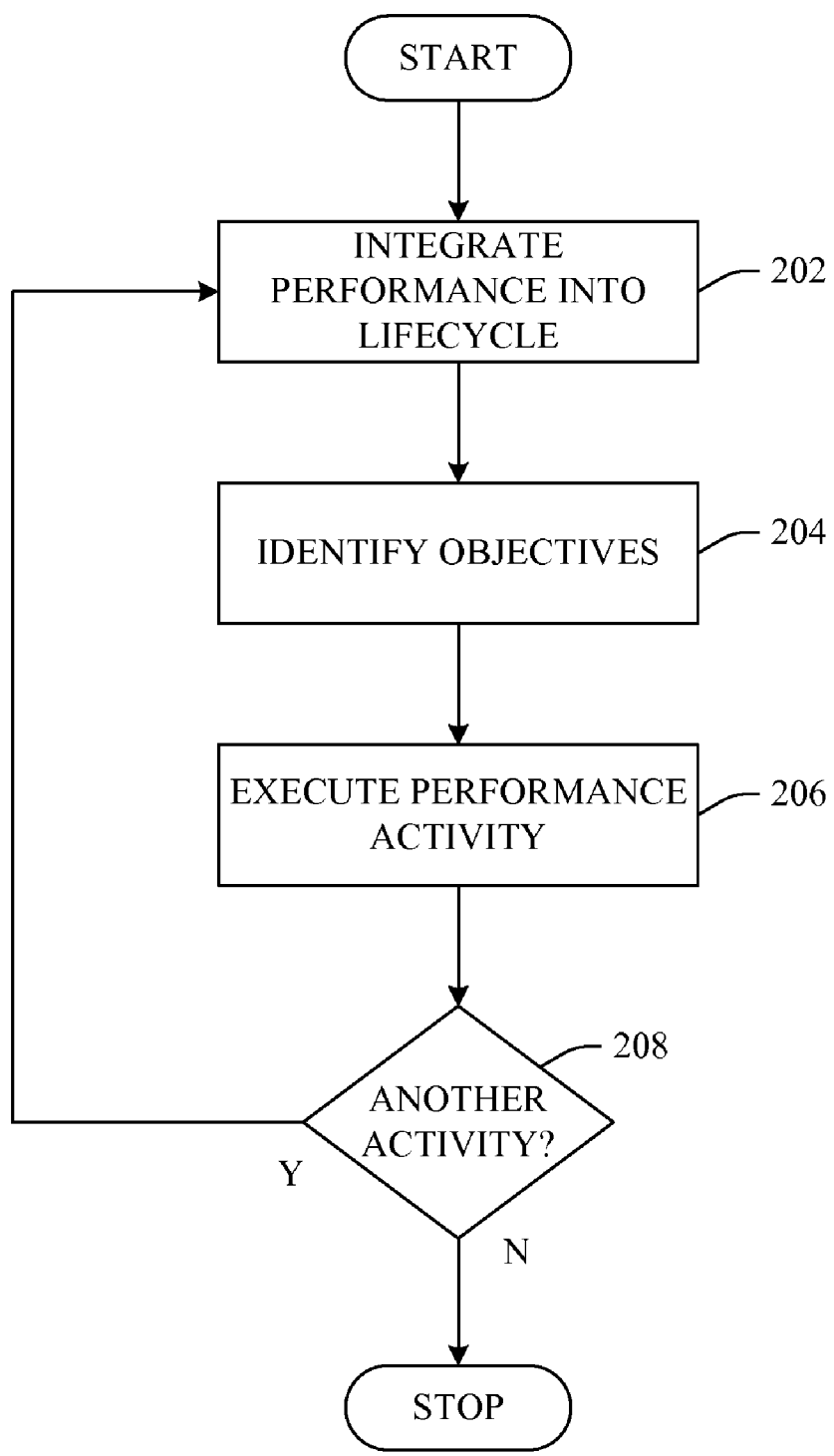
FIG. 2 illustrates an exemplary flow chart of procedures associated with a novel performance approach in accordance with an aspect of the innovation.

FIG. 2 illustrates a methodology of the novel performance engineering approach in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As illustrated in FIG. 2, the patterns & practices approach to performance engineering is summarized in accordance with an aspect of the innovation. At 202, performance can be integrated into the life cycle. More particularly, upfront performance design, performance-related coding practices, and testing for performance can all be an integral part of the application development processes.

Performance objectives can be identified at 204. In doing so, an understanding can be made early with respect to the performance objectives that correspond to an application. These objectives can play a critical role in shaping performance modeling, code reviews, testing and deployment review. A performance-related activity (e.g., 106 of FIG. 1) is executed at 206. In other words, at 206, analysis of the application in a structured and systematic manner can be effectuated to address performance-related areas of the life cycle. As described above the activities can include designing guidelines for performance, modeling for performance, architecture/design review for performance, code review for performance and testing As shown by the determination block at 208, an iterative approach can be employed to perform multiple activities. For example, some activities, such as code review performance modeling and performance testing could be performed multiple times during the development process to maximize application performance.

Figure 3:
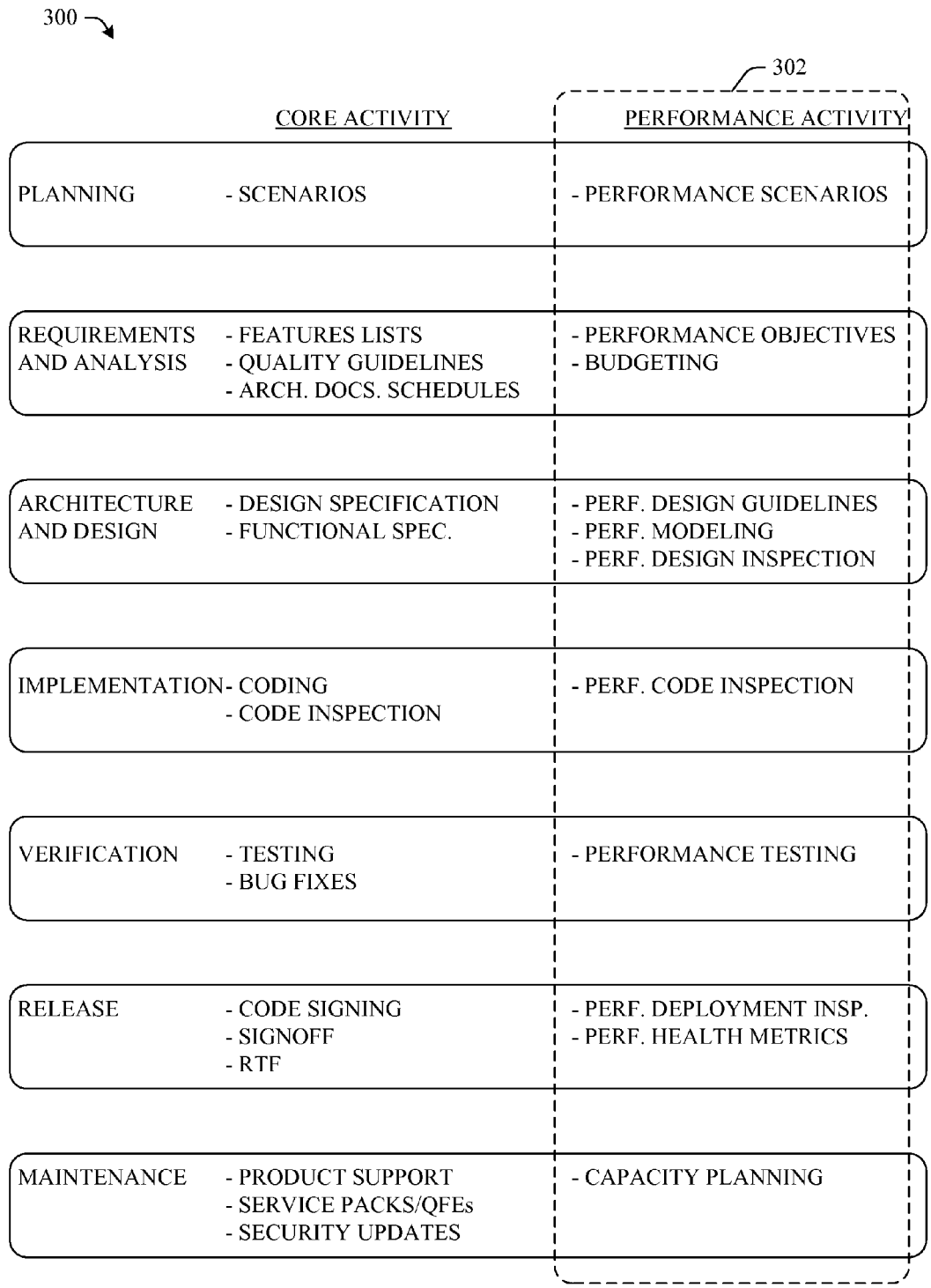
FIG. 3 illustrates an exemplary list of performance engineering activity components in accordance with the novel subject matter of the innovation.

FIG. 3 illustrates an exemplary list of performance engineering activity components 106 with respect to an application development life cycle. More specifically, FIG. 3 illustrates an exemplary life cycle diagram 300 that includes performance activities 302 in connection withal particular core application life cycle activities, Although specific activities 302 are shown in FIG. 3 it is to be understood that other activities can exist and are to be included within the scope of this disclosure and claims appended hereto.

As shown in FIG. 3, there are a number of distinct performance-related activities 302 that should be an integral part of the application life cycle. More particularly, the activities can include, but are not limited to include, performance objectives, performance design guidelines, performance modeling, performance design inspection, performance code inspection, performance testing, performance deployment inspection, and capacity planning. These activities are described in more detail below.

Knowledge of performance objectives is essential to the success of all other performance-related activities. An aspect of the innovation proposes definition of performance objectives and requirements early in the process. Performance objectives can be related to response time, throughput, resource utilization, workload, etc.

Figure 4:
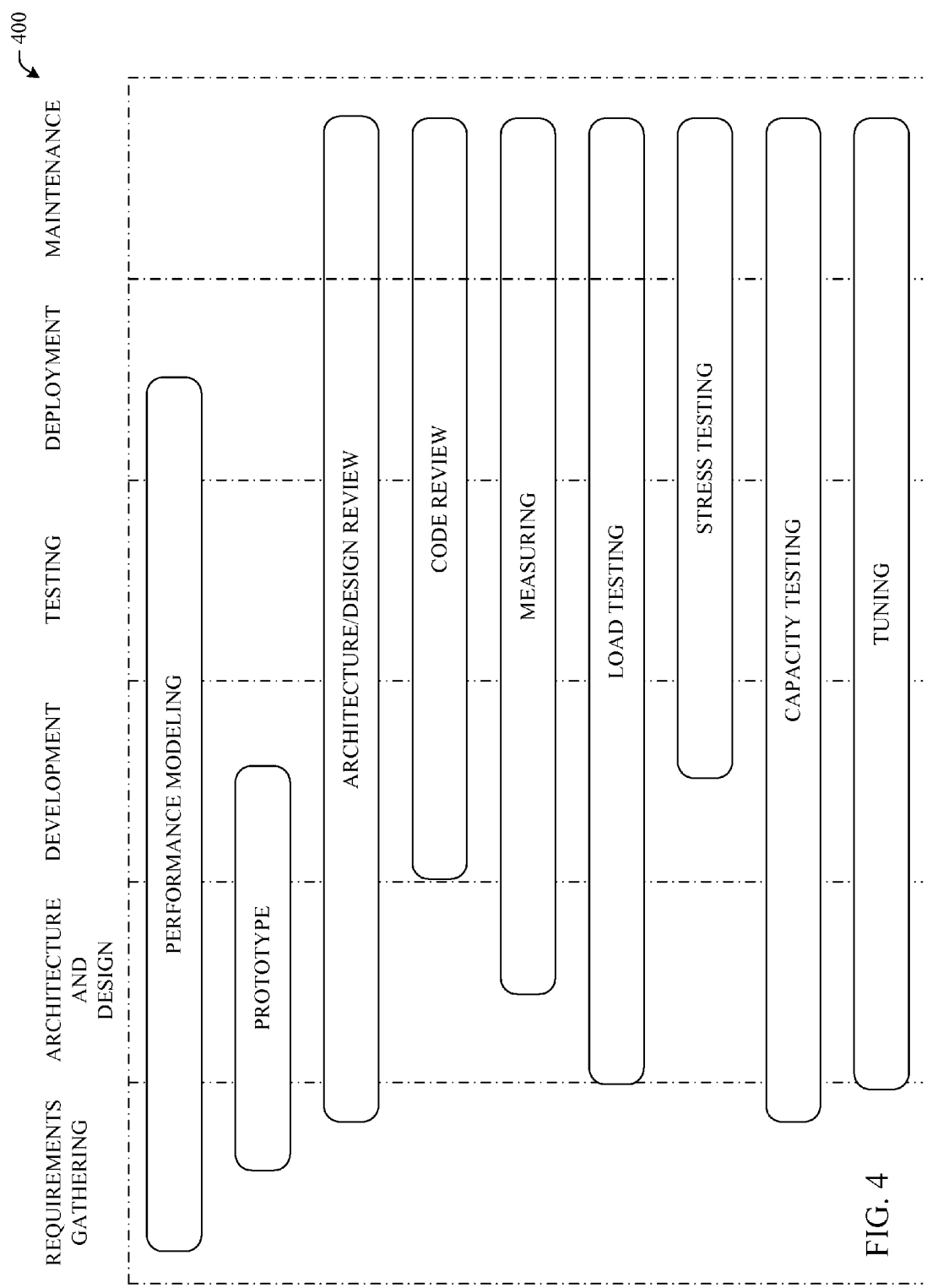
FIG. 4 illustrates an exemplary timeline with respect to exemplary performance activities in accordance with an application life cycle.

FIG. 4 illustrates a graph 400 that explains how the performance activities 302 of FIG. 3 work together. As shown, performance-related activities 302 start early and continue throughout the application life cycle, many in parallel with one another. FIG. 4 depicts how the performance activities 302 span the various activities of the application development life cycle.

As illustrated by the overlap in FIG. 4, the innovation allows the results of each activity to influence the others in order to have a performance engineering process that is more effective than the sum of its parts. By way of example, performance objectives should be considered alongside other critical business objectives. Application specific performance objectives should be identified and documented early during requirements and analysis and should be balanced along side other quality of service requirements such as security, availability and reliability.

It is to be understood that it is possible to incrementally adopt the key performance activities in retrospect. The activities that should be adopted first will depend on the performance objectives identified, as well as any outstanding problems of the process or application. For most organizations, particularly good results will come from adopting the activities in the following order:

Performance Objectives. If the performance objectives for an application are not known, it will be difficult to be successful with any other activity.

Performance Design Inspection. Performance issues introduced in the design phase are the most expensive to deal with later. By introducing architecture and design inspections focused on performance, the user can avoid the need for costly rework later in the life cycle.

Performance Modeling. By adopting performance modeling, in addition to helping focus performance development efforts, improving the overall quality of software engineering and ensuring that the user addresses relevant performance issues before they arise, the user can help test teams create plans to test for specific vulnerabilities. Performance models also serve as a focus for communication among the various roles and help to ensure that developers and IT professionals alike really understand the application.

Performance Code Inspection. Inspecting code for performance issues can save later rework or help avoid costly problems and downtime.

Performance Deployment Inspection. An application's performance can be affected by a weak link.

Design Guidelines for Performance. By adopting proven design principles and learning from others mistakes the user can ensure the application performs optimally from the start.

Performance Testing. Testing should be used to validate designed mitigations and ensure nothing has slipped through the cracks.

The patterns & practices approach to performance engineering focuses on integrating performance into the application development life cycle through the adoption of a limited set of key performance activities. It uses a pattern-based information model in the form of a set of performance categories to help systematically focus efforts on areas where performance issues are most likely encountered. The most common specific activities that make up the performance engineering discipline include defining performance objectives, applying design guidelines for performance, creating performance models, conducting architecture and design inspections for performance, completing code inspections for performance, and performing deployment inspections for performance.

Figure 5:
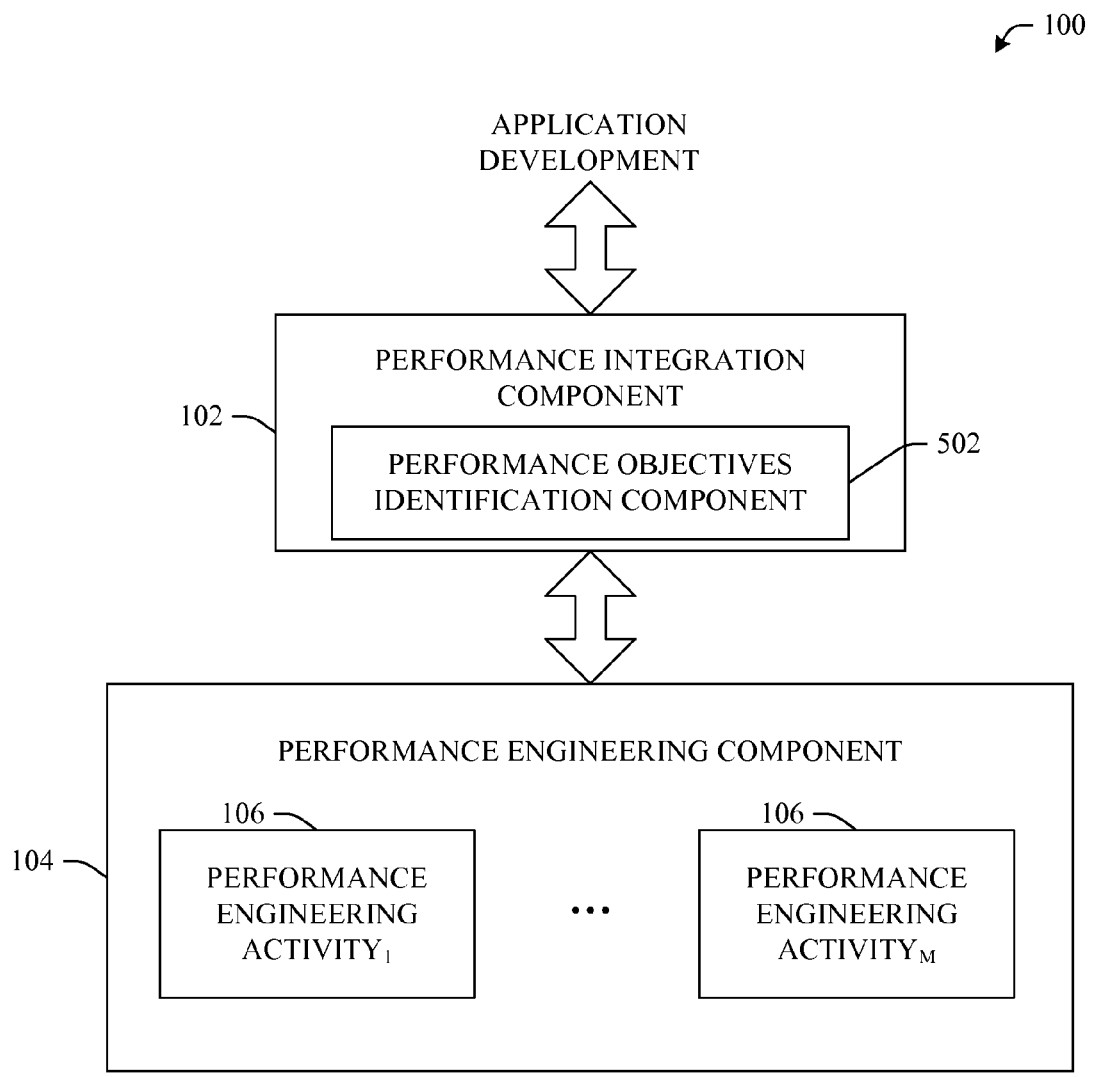
FIG. 5 illustrates a system that employs a performance objective identification component with respect to performance engineering components in accordance with an aspect of the innovation.

Turning now to FIG. 5, an alternative block diagram of system 100 is shown in accordance with an aspect of the innovation. Particularly, performance integration component 102 can include a performance objective identification component 502. Performance objectives and goals should be defined early in the application development process.

Performance objectives should ideally be identified in the requirements and analysis phase. If the objectives for the application are not known, then it is difficult to be successful with any other performance activity. Generally, performance objectives are used to:

Filter the set of design guidelines that are applicable;

Guide performance modeling activities,

Determine the scope and guide the process of architecture and design inspections;

Help set code inspection objectives;

Guide performance test planning and execution; and

Guide deployment inspections.

In each activity, the performance objectives can be used to help focus on the highest value areas while avoiding issues that will not affect the application.

Identifying performance objectives is an iterative process that is initially driven by an examination of the application's requirements and usage scenarios. By the end of the requirements and analysis phase, the user should have a first set of objectives that are not yet tied to design or implementation details. During the design phase, additional objectives will surface that are specific to the application architecture and design. During the implementation phase, the user may discover a few additional objectives based upon specific technology or implementation choices that have an impact on overall application performance. Each evolution of the performance objectives can affect other performance activities. The user should review the performance model, architecture and design review guidelines, and general code review guidelines when the performance objectives change.

Figure 6:
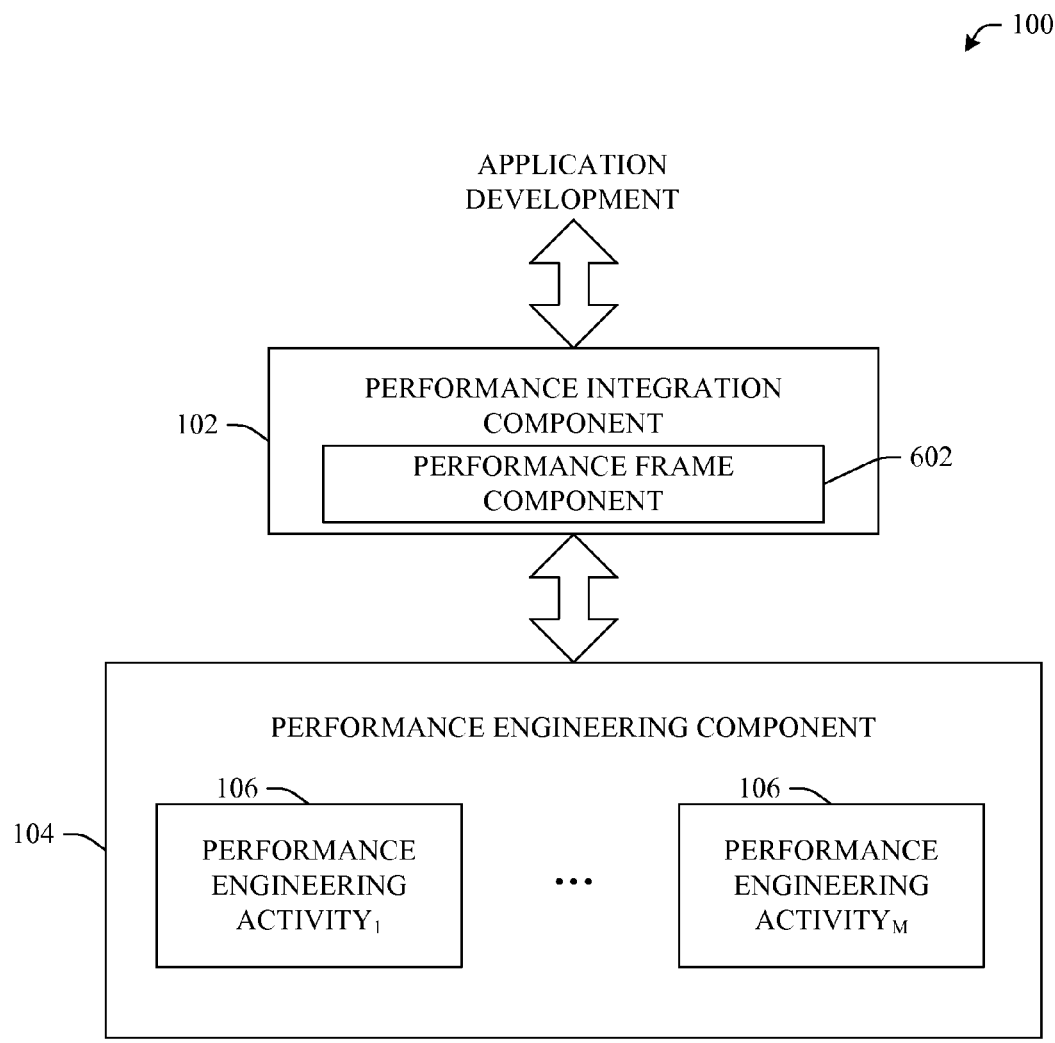
FIG. 6 illustrates a system that employs a novel performance frame component that integrates with performance engineering activities in accordance with an aspect of the innovation.

As illustrated in FIG. 6, a set of guidelines can be distilled into a pattern-based performance frame 602, or framework, that describes all of the areas in which poor design can lead to performance issues. The performance frame 602 can allow the inclusion of additional guidelines or the refinement of existing guidelines based on newly discovered performance issues. It is to be understood that design guidelines include both deployment considerations and design considerations.

The performance frame 602 is a pattern-based information model that defines a set of performance-related categories specifically for the application type being designed. These categories can represent areas where performance issues are most frequently encountered. Patterns & practices performance guidance includes context-specific performance frames (e.g., 602) for each major application type.

Design guidelines are organized by the common application performance categories contained in the performance frame 602. For example, as illustrated in FIG. 7, the categories can include, but are not limited to, coupling and cohesion, resource management, communication, caching, state management, concurrency, data structures/algorithms. These categories represent particularly key areas for application performance design, where performance issues are most often encountered. The table below shows the categories as well as key considerations associated with each category.

| Category | Key Considerations |
| --- | --- |
| Coupling and cohesion | Loose coupling and high cohesion |
| Communication | Transport mechanism, boundaries, remote interface design, round trips, serialization, bandwidth |
| Concurrency | Transactions, locks, threading, queuing |
| Resource management | Allocating, creating, destroying, pooling |
| Caching | Per user, application-wide, data volatility |
| State management | Per user, application-wide, persistence, location |
| Data structures and algorithms | Choice of algorithm<br>Arrays versus collections |

The categories in the frame can represent a prioritized set of technology-agnostic common denominators that are pervasive across applications. The categories can be employed to build evaluation criteria where performance and scalability decisions can have a large impact.

As stated earlier, the preceding example included a discussion of novel performance-related activities in accordance with an aspect of the subject innovation. Referring again to FIG. 3 is an overall view of an exemplary performance engineering system 300. By way of review, this system 300 can include a planning component, a requirements and analysis component, an architecture and design component, a development component, a testing component, a deployment component and a maintenance component.

Performance-specific aspects of the overall engineering model are identified by the dashed line in FIG. 3. More particularly, as described supra, performance objectives can be established as a part of a requirements and analysis phase. The design guidelines for performance, performance modeling and architecture/design review for performance are inclusive of the architecture and design phase of system 300. In the development phase, a code review for performance can be effectuated. Finally, load testing, stress testing and capacity testing can be effectuated in the testing phase.

As illustrated in FIG. 3, sample components for the engineering techniques are shown. More particularly, system 300 of FIG. 3 can include exemplary performance modeling, performance design inspection, load testing, stress testing and performance tuning components.

Figure 8:
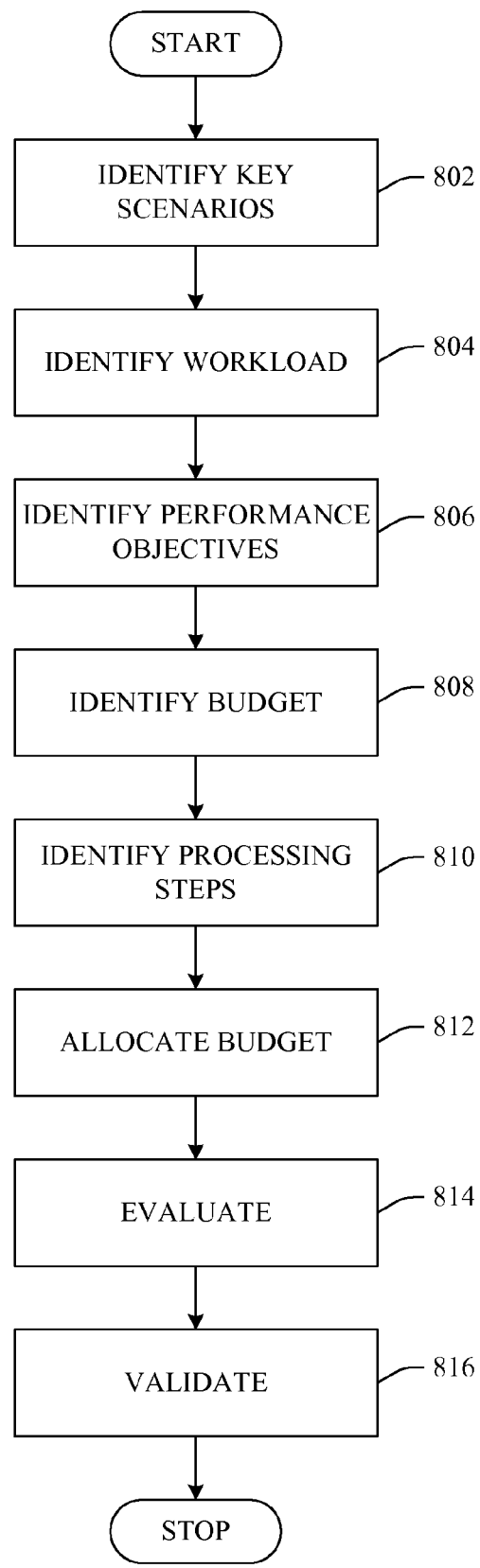
FIG. 8 illustrates an exemplary flow chart of procedures associated with a performance modeling activity in accordance with an aspect of the innovation.

FIG. 8 illustrates a methodology of performance modeling methodology in accordance with an aspect of the innovation. More particularly, FIG. 8 illustrates an eight step performance model in accordance with an aspect of the novel innovation. At 802, key scenarios can be identified. More particularly, scenarios where performance is particularly important and scenarios that pose the most risk to performance objectives can be automatically and/or dynamically identified. At 804, an applicable workload can be determined. In other words, at 804 a number of users and/or concurrent users that the system will have to support are identified.

At 806, performance objectives can be identified. For example, performance objectives for each of the key scenarios can be identified. In one particular aspect, performance objectives can reflect specific business requirements.

A budget, limitation and/or constraint can be identified at 808. In one particular example, this act can include the maximum execution time in which an operation is to be completed. In another example, this act can include an identification of resource utilization constraints, such as CPU, memory, disk I/O, network I/O, etc.

At 810, processing steps in accordance with each of the key scenarios can be identified. In other words, key scenarios can be parsed into disparate component processing steps. The budget can be allocated at 812. In this act, the total budget determined in act 808 can be allocated across the processing steps established in act 810. More particularly, this allocation can be made in order to meet the performance objectives set forth in act 806.

Once the budget is allocated at 812, the design can be evaluated at 814. In other words, the design can be evaluated against the pre-defined objectives and/or budget. It may be necessary to modify the design or spread response time and resource utilization budget differently to meet the performance objectives.

The model can be validated at 816—by way of example, the pre-defined examples can be validated at 816. As will be better understood upon a review of the figures and/or methodologies that follow, this validation act can be an ongoing activity throughout the application life cycle. As well, the validation of 816 can include prototyping, assessing, and measuring in accordance with objectives and/or budget.

Figure 9:
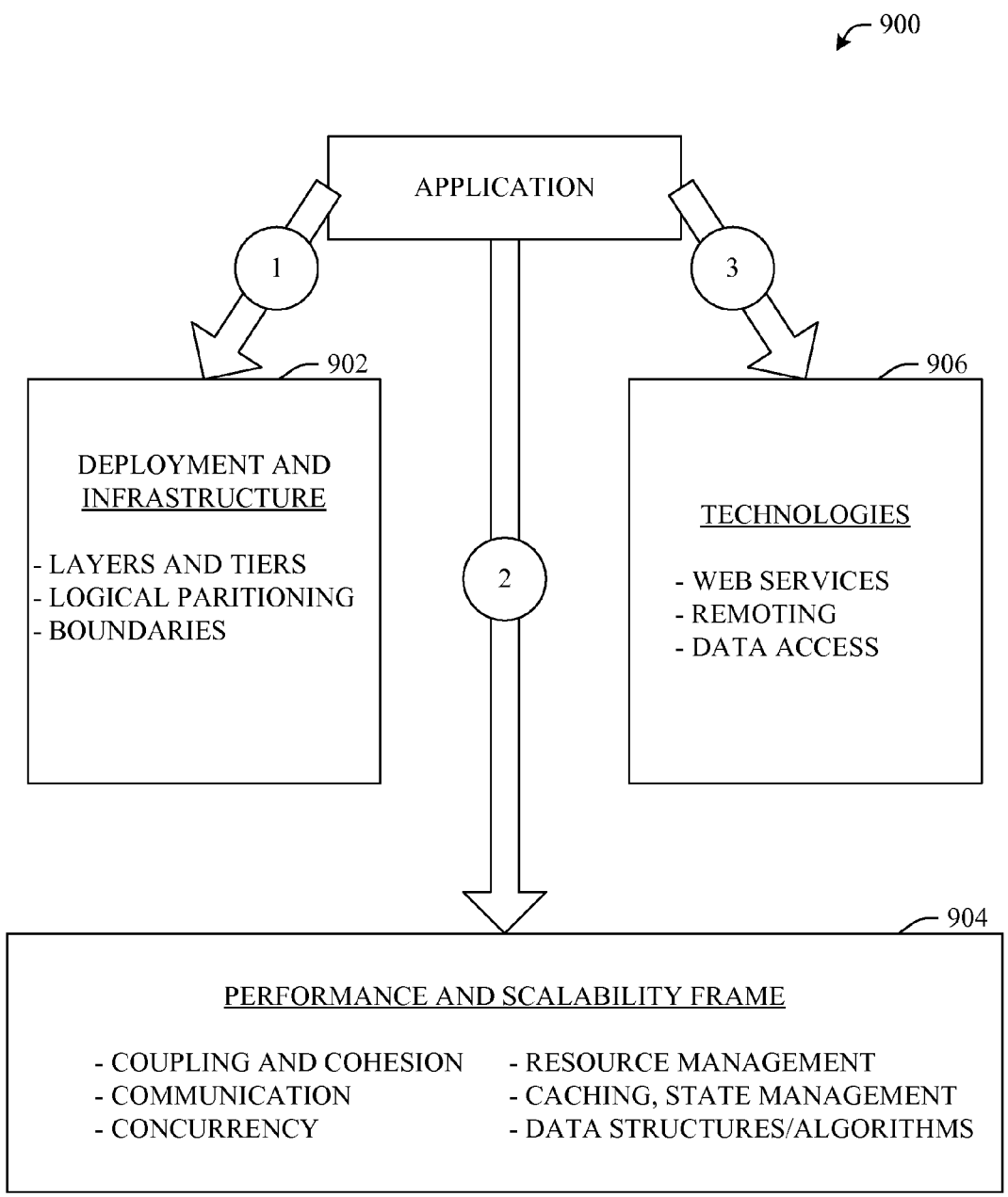
FIG. 9 illustrates a design inspect process in accordance with an aspect of the innovation.

With respect to the performance design inspection, FIG. 9 illustrates an exemplary performance design inspection phase. More particularly, at 902, deployment and infrastructure can be addressed. In other words, a review of the application in relation to a target deployment environment can be effected. Additionally, a review of any associated restrictions can be completed.

At 904, performance and scalability frame can be addressed. Here it is particularly important to pay attention to the design approaches adopted for those areas that most commonly exhibit performance bottlenecks. These areas will be understood by those skilled in the art.

Additionally, at 906, a layer by layer analysis of the application can be effected. In this phase, a walk through of the logical layers of the application can be completed. Accordingly, performance characteristics of the various technologies employed within each layer can be examined.

Figure 10:
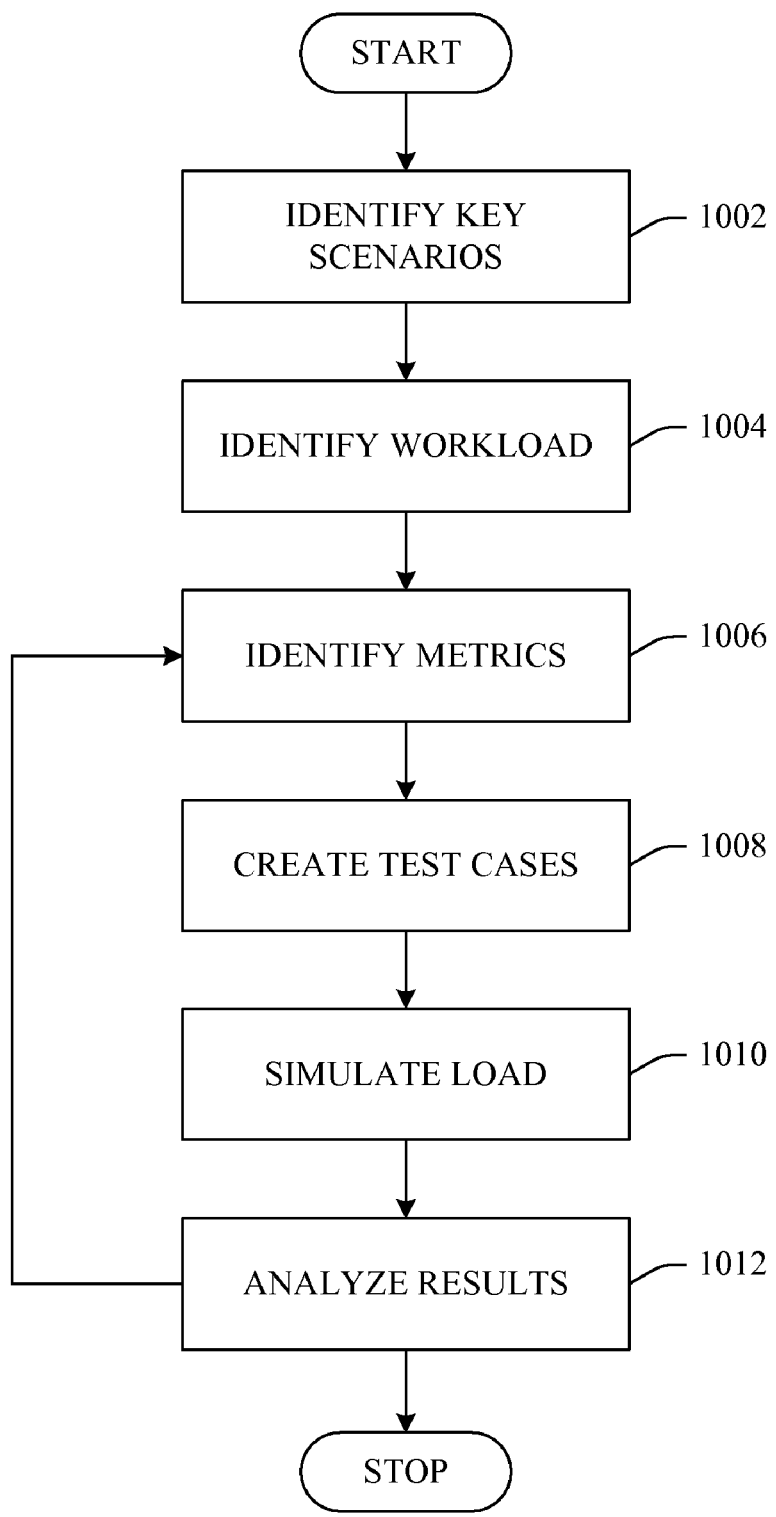
FIG. 10 illustrates an exemplary flow chart of load testing procedures in accordance with an aspect of the innovation.

FIG. 10 illustrates a methodology of load testing in accordance with the novel life cycle performance engineering aspects of the innovation. At 1002, key scenarios can be identified. These key scenarios can be described as application scenarios that are critical to the performance of the application. Next, the workload can be identified at 1004. In doing so, the total application load can be distributed among the key scenarios identified in 1002.

Metrics can be identified at 1006 in accordance with the load testing methodology. In accordance therewith, metrics can be identified that represent desired performance criterion when conducting the test. At 1008, test cases can be created whereby steps for conducting a single test along with the expected results can be defined.

The load can be simulated in accordance with the test cases at 1010. In this act, the resulting metric data can be captured. Finally, the results can be analyzed at 1012. More particularly, the metric data captured during the test can be analyzed. It will be appreciated that similar acts can be performed in connection with stress testing. These acts will be understood by those skilled in the art and are to be included within the scope of this disclosure and claims appended hereto.

Figure 11:
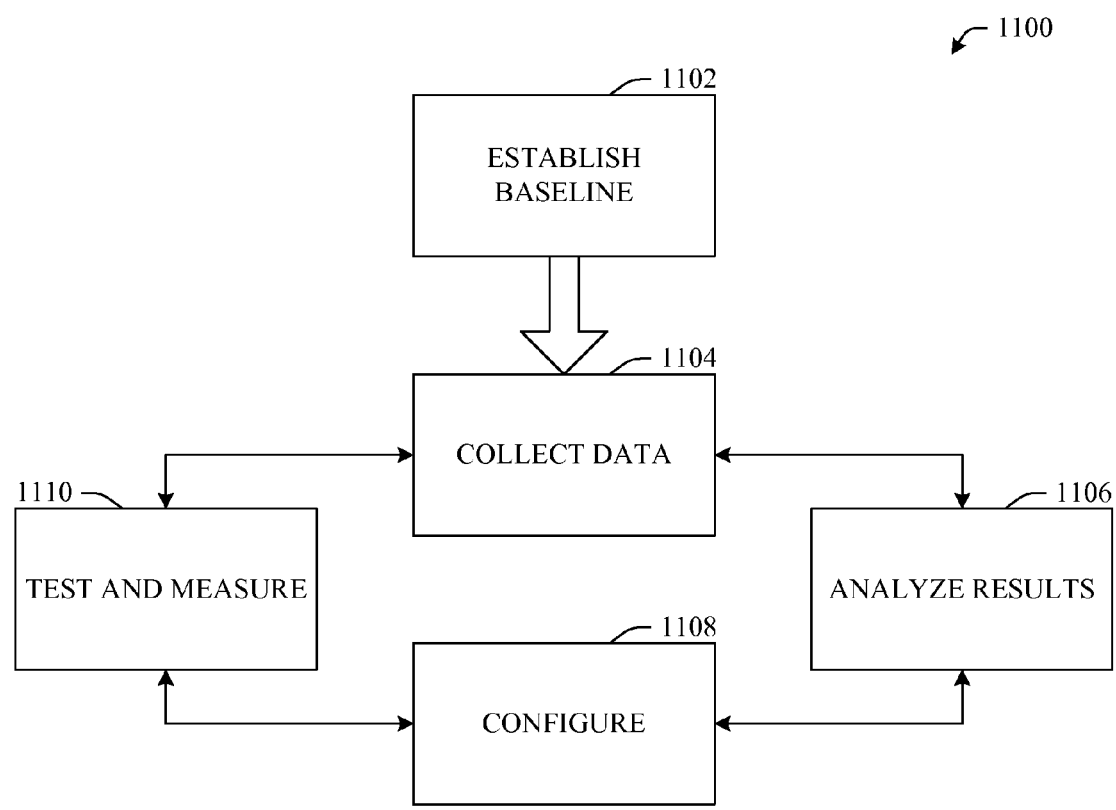
FIG. 11 illustrates an exemplary performance tuning process in accordance with an aspect of the innovation.

Turning now to FIG. 11, a performance tuning methodology 1100 is shown in accordance with an aspect of the innovation. More particularly, at 1102, a baseline can be established. In other words, at 1102, a well-defined set of performance objectives, test plans, baseline metrics, etc. can be established. As will be better understood upon a review of FIG. 12 that follows, in one aspect, this establishment of a baseline can be effectuated via artificial intelligence (AI) or machine learning techniques.

At 1104, the load and capture metrics can be simulated in order to gather information with respect to the application. In the analysis phase, 1106, performance issues and/or bottlenecks can be identified. It will be appreciated that the information gathered at 1104 can be employed to analyze the results.

In the configure phase of 1108, the application setup can be tuned by applying new system platform and/or application configuration settings. Finally, at 1110, tests and additional measurements can be effected in order to verify that configuration changes have been beneficial.

Figure 12:
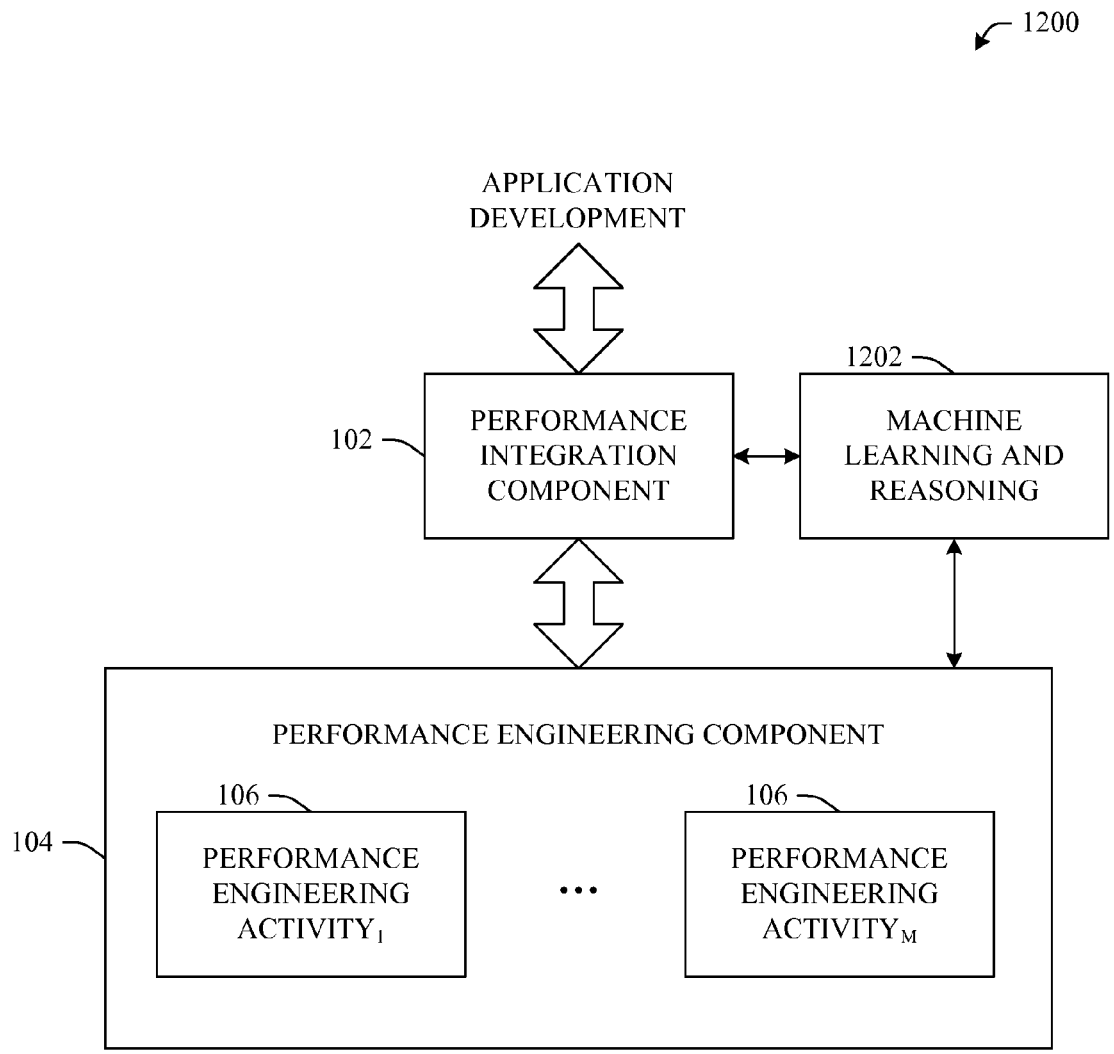
FIG. 12 illustrates a system that employs a machine learning an reasoning mechanism in accordance with an aspect of the innovation.

As illustrated in FIG. 12, in still another aspect, a machine learning and reasoning (MLR) component (e.g., artificial intelligence (AI) component) 1202 can be included which facilitates automating one or more features in accordance with the subject innovation. The subject innovation (e.g., setting a baseline, objectives, tolerances, etc.) can employ various MLR-based schemes for carrying out various aspects thereof. For example, a process for determining a baseline set of performance objectives can be facilitated via an automatic classifier system and process.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognosis or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria an appropriate set of baseline objectives as well as acceptable thresholds associated therewith.

Figure 13:
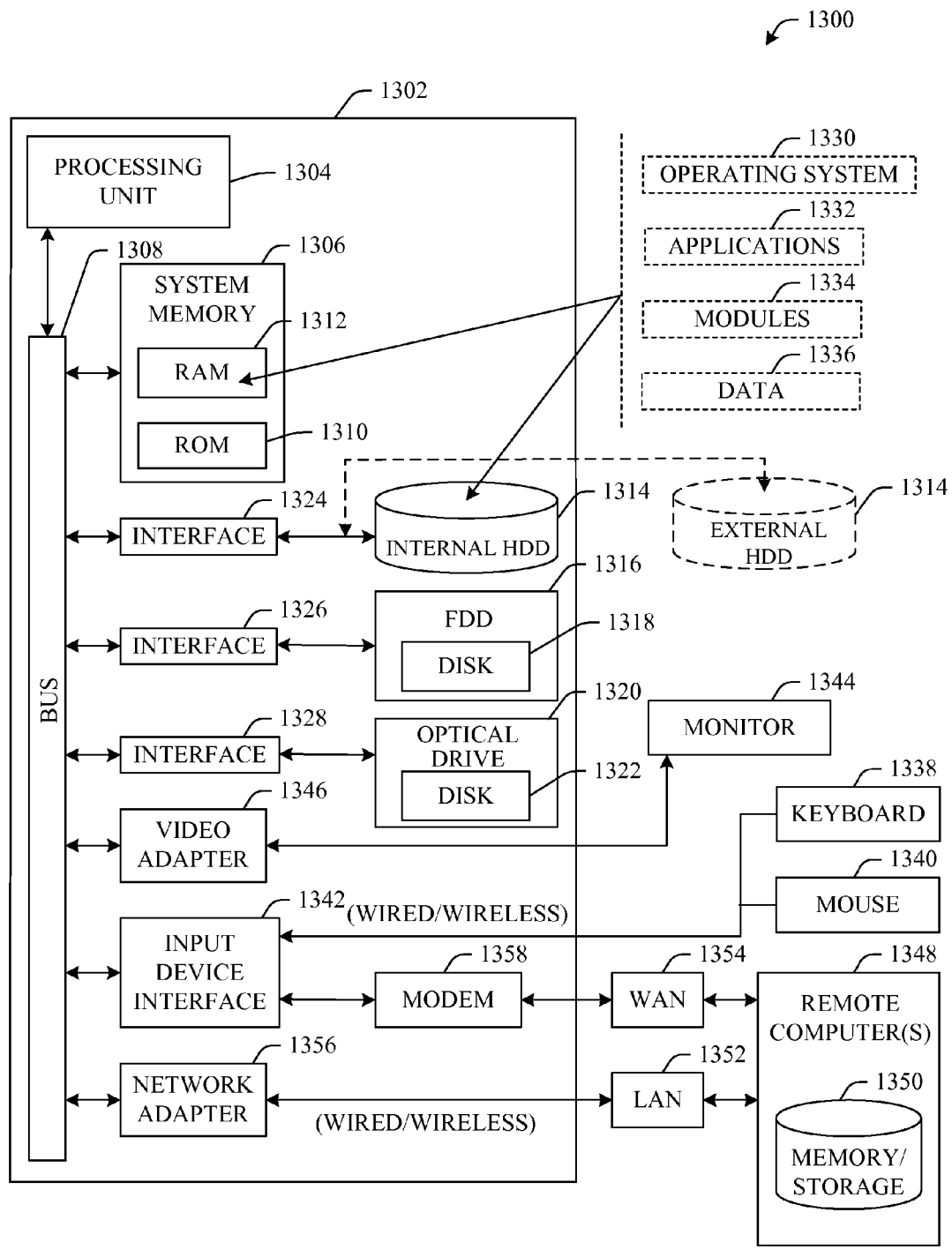
FIG. 13 illustrates an exemplary overall performance engineering system with respect to the application life cycle and in accordance with an aspect of the novel innovation.

Referring now to FIG. 13, there is illustrated a block diagram of a computer operable to execute the disclosed architecture. In order to provide additional context for various aspects of the subject innovation, FIG. 13 and the following discussion are intended to provide a brief, general description of a suitable computing environment 1300 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the innovation includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the innovation can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
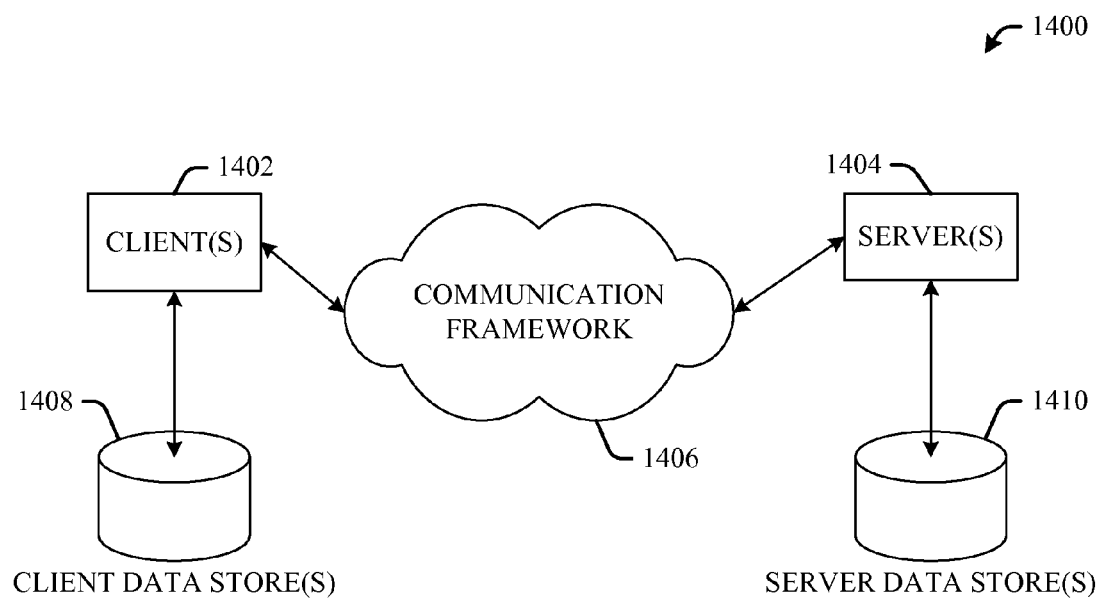
FIG. 14 illustrates an exemplary performance design inspection system in accordance with an aspect of the innovation.

Referring now to FIG. 14, there is illustrated a schematic block diagram of an exemplary computing environment 1400 in accordance with the subject innovation. The system 1400 includes one or more client(s) 1402. The client(s) 1402 can be hardware and/or software (e.g., threads, processes, computing devices). The client(s) 1402 can house cookie(s) and/or associated contextual information by employing the innovation, for example.

The system 1400 also includes one or more server(s) 1404. The server(s) 1404 can also be hardware and/or software (e.g., threads, processes, computing devices). The servers 1404 can house threads to perform transformations by employing the innovation, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates performance engineering of an application, comprising:
   one or more computer processors;
   one or more computer storage media having stored thereon computer-executable instructions in the form of:
   a performance engineering component, executable by the one or more computer processors, that includes a plurality of performance engineering activities, wherein each of the performance engineering activities are available throughout an entire life cycle of development of an application, wherein the performance engineering component produces a metric, wherein the performance engineering activities are defined by a performance frame specifically for the application, and wherein the performance frame includes a pattern-based information model for the application defining specific performance objectives;
   a performance integration component, executable by the one or more computer processors, that integrates a subset of the plurality of performance engineering activities into development of the application, such that all of the plurality of performance engineering activities are available throughout the entire life cycle, while some, but not all, of the plurality of performance engineering activities are implementable at one or more stages of the life cycle of development of the application;
   and a machine leaning and reasoning (MLR) component, executable by the one or more computer processors, providing artificial intelligence, wherein the MLR component is communicatively coupled to the performance engineering component and the performance integration component, and wherein the MLR component maps an input attribute vector to a confidence in automatically establishing a baseline and at least some performance objectives for the application.

2. The system of claim 1, the plurality of performance engineering activities includes at least one of identifying performance objectives, identifying performance models, applying performance-related design guidelines, conducting performance-related design inspections, performing regular performance-related code inspections, implementing performance testing, and conducting performance-related deployment inspections.

3. The system of claim 1, the performance integration component integrates the subset of the plurality of performance engineering activities based upon a phase of the development of the application.

4. The system of claim 3, the subset of the plurality of performance engineering activities includes a performance objectives identification activity and the phase is a requirements and analysis phase.

5. The system of claim 3, the subset of the plurality of performance engineering activities includes at least one of a performance design guidelines activity, a performance modeling activity and a performance architecture and design inspection activity and the phase is an architecture and design phase.

6. The system of claim 3, the subset of the plurality of performance engineering activities includes a performance code inspection activity and the phase is an implementation phase.

7. The system of claim 3, the subset of the plurality of performance engineering activities includes a security testing activity and the phase is a testing phase.

8. The system of claim 3, the subset of the plurality of performance engineering activities includes at least one of a performance testing and a performance deployment inspection and the phase is at least one of a verification and a release phase.

9. The system of claim 3, the subset of the plurality of performance engineering activities includes a capacity planning activity and the phase is a maintenance phase.

10. The system of claim 1, the performance integration component comprises a performance objectives identification component that interfaces with a user to identify a plurality of performance objectives.

11. The system of claim 10, the performance objectives identification component comprises a performance frame component that defines a set of performance-related categories based upon a type of the application.

12. The system of claim 11, the set of performance-related categories comprises at least one of coupling and cohesion, resource management, communication, caching, state management, concurrency and data structures/algorithms.

13. A computer-implemented method of engineering an application, comprising:
   using one or more processors of a computing system, executing computer executable instructions stored on one or more computer storage media, wherein execution of the computer executable instructions by the one or more processors causes the computing system to:
   identify a performance category;
   identify a performance objective based at least in part upon the performance category, wherein the performance category is defined by a predominance frame specifically for the application, and wherein the performance frame includes a pattern-based information model for the application defining specific performance objectives, wherein identifying the performance objective includes using a machine learning and reasoning (MLR) component providing artificial intelligence, wherein the MLR component maps an input attribute vector to a confidence in automatically establishing the performance objective based at least in part upon the performance category;
identify a budget based at least in part upon the performance objective;
after identifying the budget:
allocate the identified budget to a plurality of processing steps; and
integrate the identified budget into development of the application throughout various stages of a life cycle of the development of the application;
produce a metric for performance engineering; and
integrate a performance engineering activity based at least in part upon the performance objective.

14. The computer-implemented method of claim 13, further comprising establishing performance design guidelines based at least in part upon the performance objective.

15. The computer-implemented method of claim 13 further comprising reviewing the application from an architectural and design performance perspective.

16. The computer-implemented method of claim 13, further comprising identifying a performance model based at least in part upon the objective.

17. The computer-implemented method of claim 16, the act of identifying the performance model comprises:
identifying a usage scenario;
identifying a workload based at least in part upon the usage scenario;
identifying a performance objective based at least in part upon the workload; and
identifying a plurality of processing steps based upon the performance objective.

18. The method of claim 17, further comprising:
evaluating the application based upon the performance model; and
validating the performance objective based upon the performance model.

19. A system embodied that facilitates performance engineering of an application, comprising:
one or more computer processors;
one or more computer storage media having stored thereon computer-executable instructions in the form of:
a performance engineering component, executable by the one or more computer processors, that includes a plurality of performance engineering activities available throughout an entirety of a life cycle of development of an application, the performance engineering component for producing a metric, wherein the performance engineering activities are defined by a performance frame specifically for the application, the performance frame including a pattern-based information model for the application defining specific performance objectives;
a performance integration component, executable by the one or more computer processors, that integrates a subset of the plurality of performance engineering activities into development of the application, such that all of the plurality of performance engineering activities are available and modifiable throughout the entire life cycle, while some, but not all, of the plurality of performance engineering activities are implementable at one or more stages of the life cycle of development of the application, wherein the performance integration component selects the subset based on a stage of development: and
a machine learning, and reasoning (MLR) component, executable by the one or more computer processors providing artificial intelligence, wherein the MLR component is communicatively coupled to the performance engineering component and the performance integration component, and wherein the MLR component maps an input attribute vector to a confidence in automatically establishing a baseline and at least some performance objectives for the application,
wherein the performance engineering activities are selected from the group consisting of identifying performance objectives, identifying performance models, applying performance-related design guidelines, conducting performance-related design inspections, performing regular performance-related code inspections, implementing performance testing, and conducting performance-related deployment inspections.

* * * * *

UNITED STATES PATENT AND TRADEMARK OFFICE
CERTIFICATE OF CORRECTION

PATENT NO. : 7,890,315 B2  
APPLICATION NO. : 11/382861  
DATED : February 15, 2011  
INVENTOR(S) : John D. Meier et al.

It is certified that error appears in the above-identified patent and that said Letters Patent is hereby corrected as shown below:

In column 15, line 57, in Claim 1, delete "leaning" and insert -- learning --, therefor.

In column 18, line 21, in Claim 19, delete "development:" and insert -- development; --, therefor.

In column 18, line 22, in Claim 19, delete "learning," and insert -- learning --, therefor.

Signed and Sealed this  
Twenty-sixth Day of July, 2011

David J. Kappos  
*Director of the United States Patent and Trademark Office*